United States Patent Office 3,749,711
Patented July 31, 1973

3,749,711
ACYLAMINOPENICILLANIC ACIDS AND SALTS THEREOF
Manfred Schorr, Frankfurt am Main, and Elmar Schrinner, Wiesbaden, Germany, and Eberhard Schutze, Vienna, Austria, assignors to Farbwerke Hoechst Aktiengesellschaft vormals Meister Lucius & Bruning, Frankfurt am Main, Germany
No Drawing. Filed Sept. 18, 1970, Ser. No. 73,647
Claims priority, application Germany, Sept. 27, 1969, P 19 49 021.2, P 19 49 022.3
Int. Cl. C07d 99/16
U.S. Cl. 260—239.1          9 Claims

ABSTRACT OF THE DISCLOSURE

Antibiotically active acylaminopenicillanic acids of the General Formula I

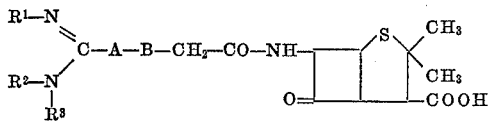

in which $R^1$, $R^2$ and $R^3$ represent hydrogen or lower alkyl groups, $R^1$ and $R^2$ may form together an alkylene group which may be substituted, A represents a phenylene or thienylene group which may be substituted and B represents oxygen or a chemical bond, and the physiologically tolerated salts thereof, pharmaceutical preparations containing these compounds and process for the preparation of such compounds and preparations.

---

The present invention provides acylaminopenicillanic acids of the General Formula I

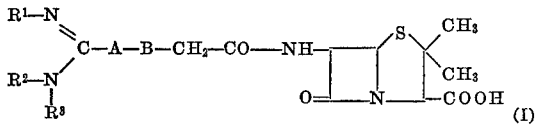

(I)

in which $R^1$, $R^2$ and $R^3$ represent hydrogen or lower alkyl, $R^1$ and $R^2$ may form together an alkylene group which may be substituted, A represents a phenylene or thienylene group which may be substituted and B represents oxygen or a chemical bond, and their physiologically tolerated salts.

The invention furthermore provides a process for the manufacture of the above-specified acyla minopenicillanic acids of the General Formula I and of their salts, wherein 6-aminopenicillanic acid (6–APA) or a salt of 6–APA is reacted with a carboxylic acid of the General Formula II

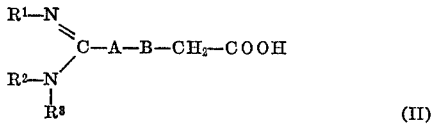

(II)

in which $R^1$, $R^2$, $R^3$, A and B have the meanings given above, especially in the form of a derivative which is capable of reacting with an amino group, or with a salt of such a compound.

If $R^1$, $R^2$ and $R^3$ represent an alkyl group, straight chain or branched alkyl groups having 1 to 5 carbon atoms may be used, the sum of the carbon atoms in the groups $R^1$, $R^2$ and $R^3$ not being higher than 6.

As alkylene groups especially those may be used which contain 2 to 4 carbon atoms. As substituents of the alkylene group, there may be mentioned by way of example, low molecular weight alkyl groups which themselves may also be closed to form a ring which may be interrupted by a hetero-atom, preferably an oxygen atom.

The substitutents of the alkylene group may contain a hetero-atom, preferably an oxygen atom.

A stands, in particular, for the 1,4-phenylene or 2,5-thienylene radical; these radicals may be substituted, for example, by low molecular weight alkyl, alkoxy or halogen.

According to the invention, for example, the following compounds of the Formula II may be used as starting materials:

4-amidino-phenylacetic acid
4-N-methyl-amidino-phenylacetic acid,
4-N,N-dimethyl-amidino-phenylacetic acid,
4-N,N'-dimethyl-amidino-phenylacetic acid,
4-N,N,N'-trimethyl-amidino-phenylacetic acid,
4-N-ethyl-amidino-phenylacetic acid,
4-N,N'-dipropyl-amidino-phenylacetic acid,
4-N-i-pentyl-amidino-phenylacetic acid,
4-N,N-dimethyl-N'-ethylamidino-phenylacetic acid,
4-(2-imidazolinyl)-phenylacetic acid,
4-(1,4,5,6-tetrahydro-2-pyrimidyl)-phenylacetic acid,
4-(1-methyl-1,4,5,6-tetrahydro-2-pyrimidyl)-phenylacetic acid,
4-(1,5-dimethyl-2-imidazolinyl)-phenylacetic acid,
4-(5,5-dimethyl-1,4,5,6-tetrahydro-2-pyrimidyl)-phenylacetic acid,
4-(1,4,6,7,8,9-hexahydro-5H-cyclopenta [d]pyrimidyl-2)-phenylacetic acid,
4-(9-oxa-2,4-diaza-spiro[5,5]undec-2-ene-3-yl)-phenylacetic acid,
4-N,N'-tetramethylene-amidino-phenylacetic acid,
3-amidino-phenylacetic acid,
4-amidino-2-methyl-phenylacetic acid or
4-amidino-2-chloro-phenylacetic acid, or the corresponding phenoxyacetic acids, thienylacetic acids or thienyloxyacetic acids.

The carboxylic acids of the General Formula II are prepared in known manner starting, for example, from 4-cyano-phenyl- or 4-cyano-phenoxy- or 5-cyano-thienyl- or 5-cyano-thienyloxyacetic acid esters. After conversion of the nitrile group into an imino ether, the resulting compound is reacted with ammonia or an amine or diamine to give the amidine and finally the carboxylic acid ester group or an acid amide group resulting therefrom is saponified.

The novel penicillins contain in their molecule an amidino group which may be substituted and have, therefore, an amphoteric nature. Other amphoteric penicillins which contain as a basic group, for example an amino group, have already been described. Among these, Ampicillin has become well known.

These amphoteric penicillins of the ampicillin type are obtained by semi-synthesis, as the products of the invention by acylation of 6-APA. Though it has been described that this would be possible by the reaction of the hydrochloride of the corresponding amino-acid chloride with 6-APA. However, owing to the low difference in the basicity of the amino groups of 6-APA and of the amino-acid used for the acylation, this reaction involves numerous side reactions and gives therefore only very poor yields. It is, for this reason, necessary to protect the amino group of the acylation component. The protective groups have to be removed eventually which by reason of the sensitivity of the penicillin molecule towards hydrolyzing, reducing and oxidizing influences is possible with great loss only. In contradistinction thereto, the novel acylaminopenicillanic acids which contain an optionally substituted amidino group can, surprisingly, be prepared in a uniform reaction and with high yields without the use of a protective group.

The novel acyl derivatives of 6-APA are obtained in a particularly advantageous manner by reacting a salt of 6-APA, such as an alkali metal salt or a tert. amino salt, for example the potassium, sodium or triethylamino salt, with a reactive derivative of a carboxylic acid of the General Formula II in a pH range which is as far as possible neutral, preferably at a pH-value in the range of from 6 to 9.

The salts of 6-APA may be used directly or may be prepared in the solution used for the reaction from 6-APA and, for example sodium bicarbonate, disodium hydrogen phosphate or triethylamine.

In general, the reaction is carried out in water. It is also possible to work in the presence of solvents which are miscible with water, for example acetone, dimethylformamide, dimethylacetamide, dioxane or tetrahydrofurane.

For the acylation of the 6–APA according to the invention, the acid chlorides of carboxylic acids of the general Formula II have proved especially suitable. They can be obtained in known manner from the carboxylic acids by reaction with thionyl chloride in an inert solvent, for example an aromatic hydrocarbon. They are then obtained in the form of hydrochlorides which can be used directly for the further reaction. In addition to the acid chlorides, there may also be used other reactive derivatives of the carboxylic acids of the general Formula II, for example acid bromides, activated esters, for example p-nitrophenyl esters, p-nitrophenyl thioesters or cyanomethyl esters, acid azides or symmetrical or mixed anhydrides.

The acylation of 6-APA is advantageously effected by adding equimolar amounts or a small excess of a compound of the Formula II to the solution of a salt of 6-APA in water or in a mixture of water and a solvent which is miscible with water.

It has proved especially favorable to introduce the hydrochloride of the acid chloride in the form of a solid. For binding the hydrogen chloride, two equivalents of a base, for example sodium, bicarbonate or triethylamine, are previously added to the solution. The reaction is carried out at room temperature or at a slightly lowered temperature, preferably at a temperature in the range of from —5° to +5° C. The pH-value, which at first is weakly alkaline, falls during the reaction to about 7. It is eventually adjusted to about 5 by means of an acid, preferably dilute hydrochloric acid, so that the amidino-group-containing acyl-aminopenicillanic acid that has formed is obtained in the form of an inner salt. For isolating the new penicillin, the solution is evaporated to dryness, preferably by freeze-drying.

In this manner a product is obtained which contains, in addition to the penicillin, also the salts formed during the reaction. If the starting products have been used in a molar proportion, which is preferred, mainly the alkali metal salts or amino salts formed during the reaction are present as impurities. If sodium bicarbonate is used for the preparation of the 6-APA salt and if an acid chloride is employed, the crude penicillin contains, for example mainly sodium chloride only. Due to the smooth course of the reaction, the penicillin salt mixtures are already so pure that they may be directly used for therapeutic purposes. They may, however, also be worked up in order to obtain the pure penicillins.

Thus, for example, the penicillin salt mixture obtained may be dissolved in water in a high concentration. In general, the penicillin separates in crystalline form from the solution so prepared. It may then be isolated in a substantially salt-free form by suction-filtration and washing with ice-water.

The new acylaminopenicillanic acids of the Formula I contain an optionally substituted amidino group in the molecule and have therefore an amphoteric character. They form inner salts and are well soluble in water with a pH-value of about 5. In the infrared spectrum, they all show the absorption band at 1770 cm.$^{-1}$ which is characteristical for the $\beta$-lactam ring. The products may furthermore be identified by their thin layer chromatogram. The quantitative determination may also be carried out in the usual manner by iodometry.

The products of the invention may be used as such, in the form of their physiologically tolerated salts or, if desired, also in the form of the above-described crude products. As such physiologically tolerated salt formers, there may be mentioned, for example, hydrochloric acid, hyrobromic acid, amidosulfonic acid, citric acid, acetic acid, and suitable bases such as sodium hydroxide, ammonia or ethanolamine.

The new acylaminopenicillanic acids have excellent antibacterial properties. Their activity spectrum covers gram-positive bacteria and encompasses, as other amphoteric penicillins, for example ampicillin, also a number of gram-negative germs. When compared in this respect with other penicillins used in medicinal therapy, distinct differences with regard to the sensitivity of the individual germs can be stated. In certain cases the new products that contain an optionally substituted amidino group are considerably superior to the known penicillins, so that they have decisive advantages in the therapy of infections caused by such germs. In Table 1 some of the new penicillins prepared according to the invention are compared with known penicillins. The values represent the minimum inhibition concentrations determined with streptococci (serological group A) in a series dilution test with a germ inoculation of $10^5$ germs per tube.

Table 2 shows the results of comparative chemotherapeutical tests on a mouse infected with streptococci.

TABLE 1

Minimum Inhibition concentration in $\gamma$/ml.
Germ: Strept. serol. Group A

| Substance: | MIC |
|---|---|
| a | 0.003 |
| b | 0.001 |
| c | 0.001 |
| d | 0.003 |
| e | 0.0015 |
| f | 0.003 |
| g | 0.003 |
| h | 0.001 |
| Penicillin V | 0.006 |
| Oxacillin | 0.025 |
| Ampicillin | 0.01 | a=6-(4-amidinophenylacetylamino)-penicillanic acid
b=6-(5-amidino-2-thienylacetylamino)-penicillanic acid
c=6-[4-(2-imidazolinyl)-phenylacetaylamino]-penicillanic acid
d=6-[4-(1,4,5,6-tetrahydro-2-pyrimidyl)-phenylacetyl-amino]-penicillanic acid
e=6-[4-(1-methyl-1,4,5,6-tetrahydro-2-pyrimidyl)-phenylacetyl-amino]-penicillanic acid
f=6-[4-(1,5-dimethyl-2-imidazolinyl)-phenylacetyl-amino]-penicillanic acid
g=6-[4-(5,5-dimethyl-1,4,5,6-tetrahydro-2-pyrimidyl)-phenylacetylamino]-penicillanic acid
h=6-(4-amidinophenoxy-acetylamino)-penicillanic acid

TABLE

Chemotherapeutical test

Test animal: Mouse
Infection: Streptococci serol. Group A
Treatment: Subcutaneous

| Substance: | $DC_{95}$ in mg/kg. |
|---|---|
| a | 0.8 |
| b | 1.6 |
| c | 1.6 |
| d | 0.8 |
| e | 0.8 |
| f | 0.8 |
| g | 0.8 |
| h | 0.4 |
| Penicillin V | 10 |
| Oxacillin | 9 |
| Ampicillin | 12 |

These tables show the valuable properties and the superior action the novel penicillins may have in the case of special infections.

Thus, the products of the invention are valuable therapeutic agents which are excellently suitable for the treatment of bacterial infections. They may be administered as such or together with the usual therapeutic auxiliary agents, adjuvants and excipients, for example, tragacanth, lactose, talcum, etc., in the form of galenical preparations, for example tablets, dragées, etc., which contain the active substance in a quantity of from 50–1000 mg., preferably 100–500 mg.; the administration may be effected per-orally or parenterally. In the latter case, the product may be administered, if desired or necessary in the form of a salt, as a solution in water.

The following examples illustrate the invention.

EXAMPLES

The new penicillins described in the following examples are characterized by the $R_F$-value of their thin-layer chromatograms. As the layer, silica gel (Merck) was used and as the solvent, a 0.1-N-aqueous ammonium acetate solution was used. The plates were developed by the action of iodine vapour. The $R_F$-value of 6-APA was found to be 0.83 under these conditions.

Example 1

(a) 4-amidinophenylacetic acid chloride-hydrochloride.—5.35 g. of 4-amidinophenylacetic acid (M.P. 295–297° C. decomp.) were suspended in 45 cc. of anhydrous benzene. Two drops of dimethylformamide and 17.9 g. of thionyl chloride were added and the whole was heated for 1½ hours under reflux. After cooling, the solid product was filtered off with suction, washed with dry benzene and dried under reduced pressure. 6.9 g. of 4-amidinophenylacetic acid chloride-hydrochloride were obtained. Melting point: 174–177° C. (decomposition).

(b) 6 - (4 - amidinophenylacetylamino) - penicillanic acid.—7.55 g. of sodium bicarbonate and 6.48 g. of 6-aminopenicillanic acid were dissolved in a mixture of 80 cc. of water and 20 cc. of acetone, the solution was cooled to 0° C. and 6.9 g. of 4-amidinophenylacetic acid chloride-hydrochloride were added. The whole was stirred for one hour at the same temperature. During this time the pH-value fell to about 6.8. It was adjusted with caution to 5.0 by adding 2 N-hydrochloric acid, the solution was filtered and freeze-dried. 14.6 g. of a crude product were obtained which contained, in addition to 6-(4-amidinophenylacetylamino)-penicillanic acid, sodium chloride which had formed during the reaction.

The crude penicillin was dissolved in 25 cc. of water and the solution was allowed to stand for two hours in an ice bath. 6.5 g. of 6-(4-amidinophenylacetylamino)-penicillanic acid separated in crystalline form which were filtered off with suction, washed with a small amount of ice-water, acetone and ether and dried under reduced pressure. The product was found to decompose at 208–210° C. According to the iodometric determination method, the content was found to be 94%. $R_F$-value: 0.51.

In analogous manner, there were obtained as crude products:

6-(5-amidino-2-thienylacetylamino)-penicillanic acid; $R_F$-value: 0.53;
6-[4-(2-imidazolinyl)-phenylacetylamino]-penicillanic acid; $R_F$-value: 0.33;
6-[4-(1,4,5,6-tetrahydro-2-pyrimidyl)-phenylacetylamino]-penicillanic acid; $R_F$-value: 0.25;
6-[4-(1-methyl-1,4,5,6-tetrahydro-2-pyrimidyl)-phenylacetylamino]-penicillanic acid; $R_F$-value: 0.17;
6-[4-(1,5-dimethyl-2-imidazolinyl)-phenylacetylamino]-penicillanic acid; $R_F$-value: 0.27;
6-[4-(5,5-dimethyl-1,4,5,6-tetrahydro-2-pyrimidyl)-phenylacetylamino]-penicillanic acid; $R_F$-value: 0.23;
6-[4-(1,4,6,7,8,9-hexahydro-5H-cyclopenta[d]pyrimidyl-2)-phenylacetylamino]-penicillanic acid; $R_F$-value: 0.25;
6-[4-(9-oxa-2,4-diaza-spiro[5,5]undec-2-ene-3-yl)-phenylacetyl-amino]-penicillanic acid; $R_F$-value: 0.28.

Example 2

(a) 4-amidinophenoxyacetyl chloride-hydrochloride.—9.7 g. of 4-amidinophenoxyacetic acid (M.P. 324–326° C.) were suspended in 50 cc. of anhydrous benzene, 29.7 g. of thionyl chloride were added and the whole was heated for 1 hour on the steam bath under reflux. After cooling of the reaction mixture, the solid product was filtered off with suction. 11.4 g. of 4-amidinophenoxyacetyl chloride-hydrochloride were obtained, which was found to have a decomposition point of 142–143° C.

(b) 6 - (4 - amidinophenoxyacetylamino)-penicillanic acid.—6.48 g. of 6-aminopenicillanic acid and 7.56 g. of sodium bicarbonate were dissolved in a mixture cooled to 0° C. of 160 cc. of water and 70 cc. of acetone and 7.47 g. of 4 - amidinophenoxyacetyl chloride - hydrochloride were added in one portion at the same temperature. After 5 minutes, the whole had dissolved. The solution was filtered and the filtrate was maintained for 1 hour at 0° C. The pH-value was then adjusted to 5.0 by addition of 1 N-hydrochloric acid. Crystallization set in and for completing the crystallization, the whole was allowed to stand for some time at 0° C. Finally, the product was filtered off with suction and washed successively with ice-water, acetone and ether. 5.1 g. of 6-(4-amidinophenoxyacetyl-amino)-penicillanic acid were obtained which were found to decompose from 204° C. on. Iodometric determination showed a content of 95%. $R_F$-value: 0.49.

In analogous manner there was obtained:

6-[4-(9-oxa-2,4-diaza-spiro[5,5]undec-2-ene-3-yl)-phenoxyacetyl-amino]-penicillanic acid; melting point: 205° C. (decomposition); $R_F$-value: 0.28.

Example 3

(a) 4 - (2-imidazolinyl)-phenoxyacetyl chloride-hydrochloride.—25 cc. of thionyl chloride were added to a suspension of 4.4 g. of 4 - (2-imidazolinyl)-phenoxyacetic acid (M.P. 278–280° C. (decomposition)) in 25 cc. of anhydrous benzene and the whole was heated for 3 hours under reflux. After the reaction mixture had cooled, the solid product was filtered off with suction and dried under reduced pressure. 4.9 g. of 4-(2-imidazolinyl)-phenoxyacetyl chloride-hydrochloride were obtained; the product was found to decompose from 195° C. on.

(b) 6 - [4 - (2 - imidazolinyl) - phenoxyacetylamino]-penicillanic acid.—2.96 g. of 6-aminopenicillanic acid and 5.12 g. of sodium bicarbonate were dissolved at 0° C. in 30 cc. of water and 4.9 g. of 4-(2-imidazolinyl)-phenoxyacetyl chloride-hydrochloride were added. The whole was stirred for 1 hour at the same temperature, the pH-value of the solution was adjusted to 5.0 by the addition of 1 N-hydrochloric acid, the solution was filtered and freeze-dried. 8.9 g. of a loose powder were isolated which contained, in addition to sodium chloride, 51% (determined by iodometry) of 6 - [4-(2-imidazolinyl)-phenoxyacetyl-amino]-penicillanic acid. $R_F$-value: 0.29.

In analogous manner there were obtained:

6-[4-(5,5-dimethyl-1,4,5,6-tetrahydropyrimide-2-yl)-phenoxyacetylamino]-penicillanic acid; $R_F$-value: 0.27;
6-[4-(1,4,5,6-tetrahydropyrimide-2-yl)-phenoxyacetyl-amino]-penicillanic acid; $R_F$-value: 0.25;
6-[4-(1-ethyl-1,4,5,6-tetrahydropyrimide-2-yl)-phenoxyacetylamino]-penicillanic acid; $R_F$-value: 0.22.

We claim:
1. An acylaminopenicillanic acid of the formula

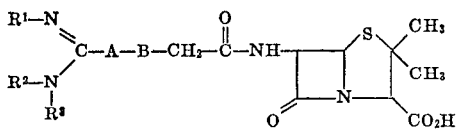

and salts thereof with a physiologically tolerated acid or base, wherein $R^1$, $R^2$, and $R^3$, taken alone, are hydrogen or lower alkyl; $R^1$ and $R^2$, taken together, are alkylene having from 2 to 4 carbon atoms, alkylene having from 2 to 4 carbon atoms substituted with lower alkyl, or alkylene having from 2 to 4 carbon atoms substituted with lower alkylene or lower oxa-alkylene forming a carbocycle or oxygen heterocycle therewith; A is thienylene, phenylene, or thienylene or phenylene substituted by lower alkyl, lower alkoxy, or halogen; and B is oxygen or a chemical bond.

2. 6-(4-amidinophenylacetylamino)-penicillanic acid.

3. 6-(5-amidino - 2 - thienyl-acetylamino)-penicillanic acid.

4. 6-(4-amidinophenoxy-acetylamino)-penicillanic acid.

5. 6 - [4 - (1,4,5,6-tetrahydropyrimide-2-yl)-phenoxyacetylamino]-penicillanic acid.

6. 6-[4-(9-oxa-2,4-diazaspiro[5,5]undec - 2 - ene-3-yl)-phenoxyacetylamino]-penicillanic acid.

7. 6 - [4-(2-imidazolinyl)-phenyl-acetylamino]-penicillanic acid.

8. 6-[4 - (1,4,5,6 - tetrahydropyrimide - 2 - yl)-phenylacetylamino]-penicillanic acid.

9. 6-[4-(5,5-dimethyl - 1,4,5,6 - tetrahydropyrimide-2-yl)-phenylacetylamino]-penicillanic acid.

References Cited
UNITED STATES PATENTS
3,499,885   3/1970   Crast ------------ 260—239.1

NICHOLAS S. RIZZO, Primary Examiner

U.S. Cl. X.R.
424—271